Jan. 31, 1967 L. W. BELL ETAL 3,302,095
DIRECT CURRENT TO ALTERNATING CURRENT CONVERTER
Filed Aug. 16, 1963 2 Sheets-Sheet 1

INVENTORS
Laurence W. Bell
BY Marion D. Hillyer

Henry Heyman

INVENTORS
Laurence W. Bell
Marion D. Hillyer
BY Henry Heyman

United States Patent Office 3,302,095
Patented Jan. 31, 1967

3,302,095
DIRECT CURRENT TO ALTERNATING CURRENT CONVERTER
Laurence W. Bell, 717 Benicia Road, and Marion D. Hillyer, 1026 York St., both of Vallejo, Calif. 94590
Filed Aug. 16, 1963, Ser. No. 302,519
6 Claims. (Cl. 321—35)

The present invention relates to apparatus and method for converting direct current to alternating current, and more particularly to a static type converter for efficiently converting very large direct currents of low voltage to alternating currents.

It is well known in the art of current conversion that either an electron or gaseous discharge beam can be deflected by a properly oriented magnetic field. It is also known that if an electron source is supported at a center of radius with respect to a pair of adjacent anodes, an alternating transverse magnetic field is capable of switching the electrons from one of the anodes to the other. A transformer having a center tapped primary winding properly connected to the anodes and to a source of direct current potential gives rise to an alternating current in its secondary winding. Apparatus of this general type is shown in Patent 1,114,697 to A. W. Hull.

Although the use of a gaseous discharge instead of an electron beam switched between two cathodes would obviously permit the conversion of much greater amounts of direct current to alternating current, the lack of control over the discharge, once established, inhibited belief in the feasibility of this method in the prior art. One reason was undoubtedly the susceptibility of flash-back between anodes unless the plasma between cathode and one anode was rigorously isolated from adjacent anodes by shielding grids or by enclosing the cathode by its respective anode. Furthermore, the prior art seems to establish that if a gaseous discharge is to be alternately switched between two anodes to convert direct current to alternating current, this could be done by controllably bypassing the beam from the main anode. Patent 2,326,677 issued August 10, 1943, to Adolph Perelmann illustrates this method.

In accordance with the present invention direct current is converted to alternating current by varying the amplitude of the current in accordance with a sine wave function, substantially, and switching the gaseous discharge current as it passes through zero value from one anode to the other anode, where the anodes are connected to the ends of a center tapped transformer primary winding, thus producing true alternating current in the transformer secondary winding.

It is accordingly an object of the present invention to provide a method and apparatus for converting direct current to alternating current.

Another object of the invention is to provide means for controlling the amplitude of a gaseous discharge current.

Still another object of the invention is to provide a simplified method and apparatus for alternately switching a gaseous discharge current between two anodes.

Another object is to provide a novel apparatus and method for amplitude modulating a gaseous discharge current.

Other objects and advantages of this invention will become apparent from the following description of certain preferred embodiments which will be described with reference to the accompanying drawings, in which.

Figure 1:
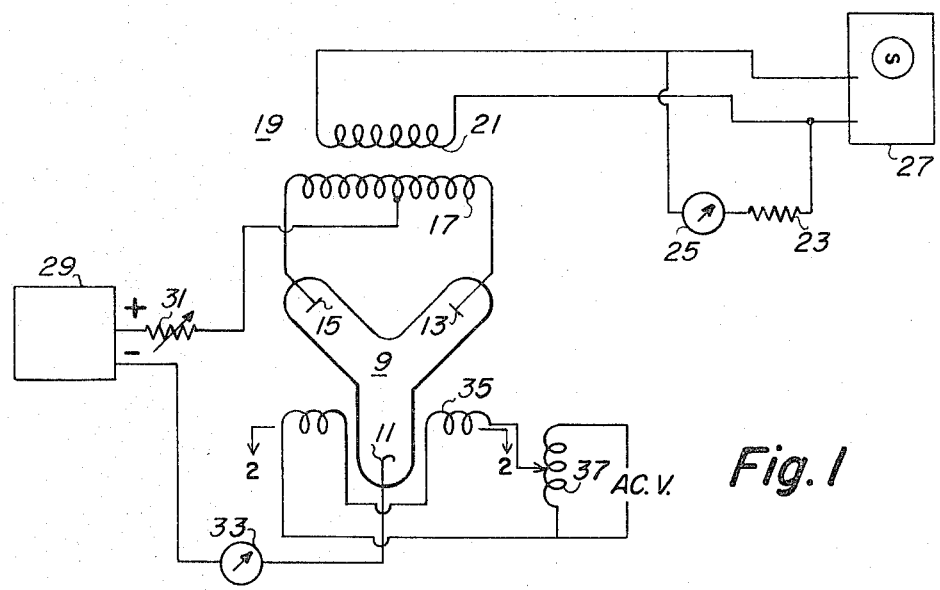
FIGURE 1 illustrates an apparatus and method for converting direct current to alternating current of any selected frequency.
Figure 2:
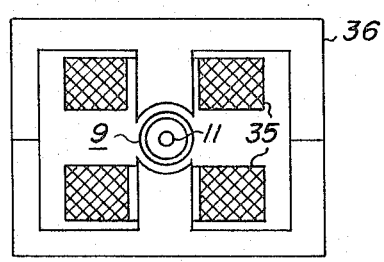
FIGURE 2 is a cross sectional view on plane 2—2 of FIGURE 1.

Referring now to FIGURES 1 and 2, a gaseous discharge tube 9 having a cathode 11 and two anodes 13 and 15 is connected in a direct current to alternating current converting circuit. The anodes 13–15 are connected to the opposite ends of a center tapped primary 17 of power transformer 19. The secondary 21 is connected to resistive load 23 through alternating current ammeter 25. A cathode ray oscilloscope 27 is connected across the secondary 21 in order to observe the waveform. Energization for the circuit is supplied by direct current source 29 through a limiting resistor 31 and an ammeter 33. Deflecting means for switching the gaseous discharge from one anode to the other is provided by deflecting coil 35 which is energized by an adjustable source 37 of alternating sweep current of the desired frequency.

Tube 9 may be of any type gaseous discharge tube such as liquid metal cathode, thermionic gas filled or cold cathode, but in this embodiment the tube contained argon gas. In operation, initial conduction was established from the cathode to one anode with no sweep field and the gaseous discharge was visibly detected as between the cathode and one anode only. The amplitude of current flow is controlled by adjustment of resistor 31. After the current flow was established between the cathode and one anode, the sweep coil was energized by the alternating current sweep source 37. The sweep coil 35 is supported so that its axis lies in the plane of the cathode and two anodes and normal to the median line between the anodes and the cathode. The energization of the sweep coil was increased to a point where the instruments showed that conduction was established to exist alternately between the cathode and *both* anodes. Alternating current was observed in the oscilloscope as long as the sweep excitation remained at the above mentioned value. When the sweep excitation was again reduced, no alternating current was present in the transformer secondary circuit.

In one embodiment of the circuit above described, sweep coil 35 comprised two bobbins each having 400 turns of number 28 enameled wire, layer wound. An iron yoke 36 (see FIGURE 2) of opposed E-shape lamina was provided having a center section cross section of 5/16 inch by 3/4 inch and having the center leg of the E foreshortened to accommodate the gaseous discharge tube. The tube contained xenon gas at four atmospheres pressure and had a striking voltage of 3000.0 volts and an internal voltage drop of 400.0 volts when the current was 10.0 amperes. The sweep coils were connected in series and the sweep coil excitation current of one ampere at 16 volts was sufficient to sweep the gaseous discharge alternately between anodes.

It is apparent that the output waveform obtained from the circuit thus far described will not be sine wave, unless wave shaping expedients are inserted in the circuit. In general, such devices are to be avoided because their effectiveness is not a constant with changing load conditions. In accordance with present invention a novel compensating phenomena is used.

Figure 3:
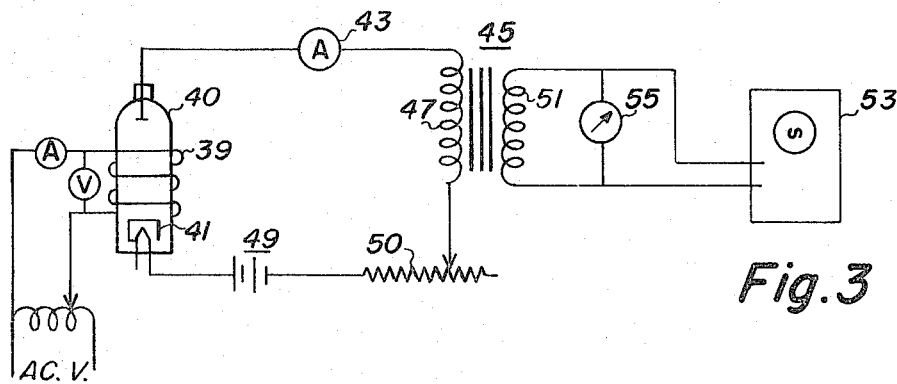
FIGURE 3 illustrates a novel apparatus and method for controlling the amplitude of an electrical gaseous discharge.

Referring now to FIGURE 3 it is seen that a coaxial coil 39 surrounds the gaseous discharge tube 40. Tube 40 is a standard commercial tube Taylor type CTY3B which is a gaseous discharge tube utilizing xenon gas at low pressure. Coaxial coil 39 consists of 600.0 turns of No. 28 enamel insulated wire. The coil has an inside diameter of 1 5/8 inches in order to accommodate the tube.

Figure 4:
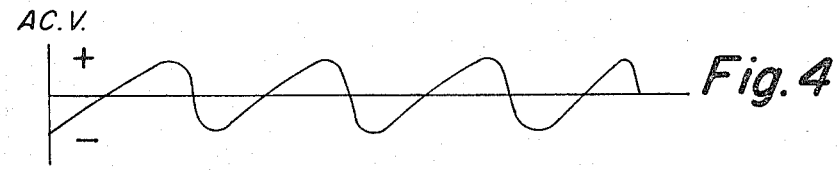
FIGURES 4 and 5 illustrates certain voltage waveforms generated by the apparatus of FIGURE 3.
Figure 5:
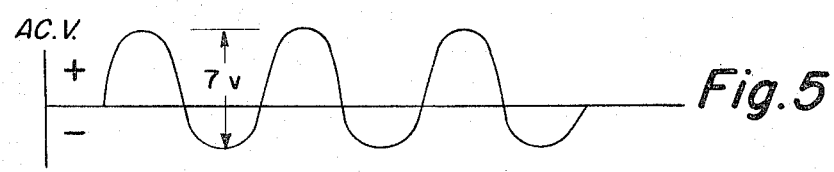

The coil is supported on the exterior of tube 40 on a plane midway, substantially, between the anode and the shield 41. The tube is connected as shown, with the anode connected through ammeter 43 to primary 47 of transformer 45 and to direct current potential source 49 through load adjusting resistor 50. The cathode 41 in this embodiment is also heated by direct current to avoid any possibility of alternating current influence due to A.C. cathode excitation. The secondary winding 51 of transformer 45 is connected to oscilloscope 53 and voltmeter 55. With the circuits energized, the anode current was adjusted to two amperes. The control or accelerating coil 39 is energized with ten volts of alternating current with a ½ ampere current flow. The output waveform across the secondary 51 of transformer 45 is the alternating wave shape shown in FIGURE 4. The output alternating voltage as shown on output voltmeter 55 and on oscilloscope 53 is 2½ volts. When the accelerating coil current is increased to 2 amperes, the voltage across the transformer secondary increased to 5 volts and at the same time the anode current decreased to 1¾ amperes. Upon an increase of energization current in the accelerating coil to 5 amperes, the output wave-form became non-symmetrical as shown in FIGURE 5. The output voltage across winding 51 increased to 7 volts while the anode current decreased to 1½ amperes.

The exact explanation as to the mechanism involved which enables an alternating magnetic field which is ostensibly parallel to a gaseous discharge current to modulate the discharge current is not known. It is possible that the phenomena discussed on page 308 of the book Electronics by Millman and Seeley, published by Mc-Graw-Hill Book Company in 1941 is involved. This reference discloses that in a gaseous discharge, in addition to the ions that drift toward the anode, there is also a radial ion current density which represents those ions which move out of the region of the plasma. The reference also states that even though this density is small, it is nevertheless important because it represents a removal of ions from the plasma, i.e., it represents a degree of deionization. The alternating coaxial magnetic field of the present invention is thought to collimate the ion beam and thus increase the amount of ionization when its polarity is in one direction and to decrease the amount of effective ionization when the polarity is in the opposite direction. In any case, it is clear from applicants' discoveries that the current passing through a gaseous discharge tube can be modulated by a coaxial varying magnetic field.

Figure 6:
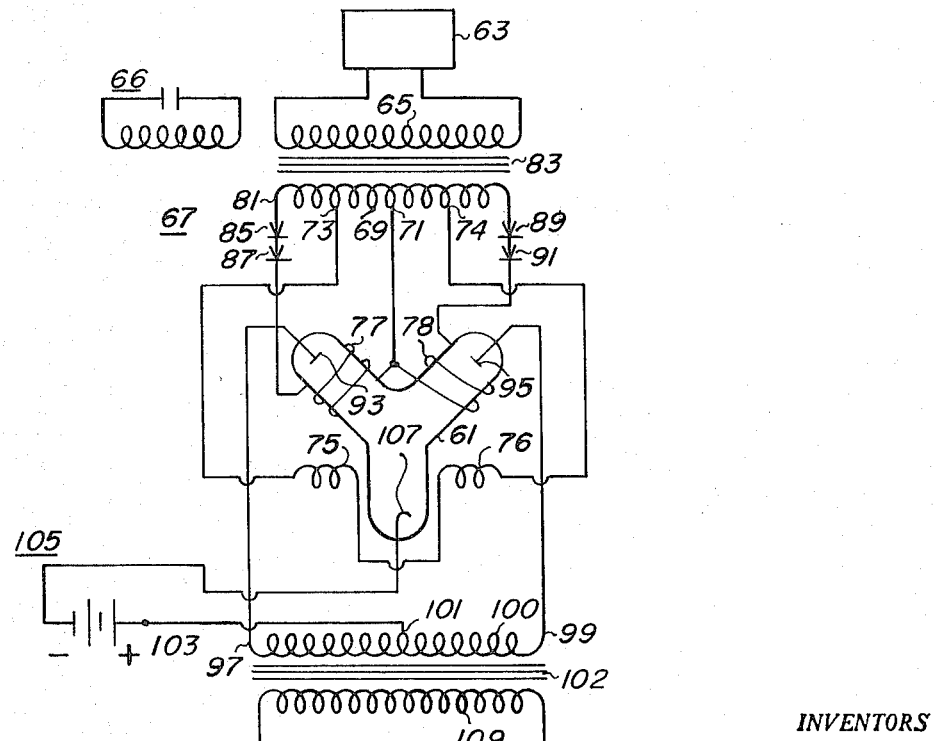
FIGURE 6 illustrates a preferred improved embodiment for generating alternating current power from direct current.

The combination of the teachings pertinent to the transverse sweep magnetic field and the coaxial modulating magnetic field is shown in FIGURE 6. In this circuit, it is assumed that a local source of alternating current is not available, as would be the case where the invention is applied to the production of alternating current from a nuclear reactor low voltage direct current generator in a non-developed geographical location. The gaseous discharge tube may be of any commercial type, but it is preferred that the plasma be vaporized cesium or rubidium or potassium operating in conjunction with a cathode material having a higher work function than the ionization potential of the vaporized conducting medium. However, the invention is not limited to the use of any one cathodic material and mercury, sodium, sodium-potassium alloy, or other well known materials can be used instead of cesium, or the tube can be filled with argon, helium, hydrogen, neon or other gases. The operation of the sweep circuit requires a source of alternating current, which in this case is generated by crystal controlled oscillator 63. The output of the A.C. generator is applied to the primary winding 65 of a special power coupling and wave shaping transformer 67. Although not entirely essential, a resonant tank circuit 66 is tightly coupled to the core of transformer 67 to aid in perfecting the sine waveform. The secondary winding is provided with a center tap 71 and two intermediate taps 73 and 74. The sweep or deflecting coils 75 and 76 are serially connected together and to the two intermediate terminals 73 and 74 of transformer 67. The accelerating coaxial coils 77 and 78 are connected across transformer terminals 71-81 and 71-83 respectively through rectifier-zener diode combinations. Accelerating coil 77 is connected through rectifier 85 and zener diode 87. Accelerating coil 78 is connected through rectifier 89 and zener diode 91. Anodes 93 and 95 are connected to the end terminals 97 and 99 respectively of output power transformer primary winding 100. The primary winding 100 is provided with a center tap 101 which is connected to the positive terminal 103 of direct current power supply source 105. The negative terminal of power supply source 105 is connected to the tube cathode 107. The cathode 107 is preferably of the metal pool type heated by the usual means in the art by electrical energy also supplied by source 105. Output power transformer secondary 109 supplies alternating power of sinusoidal waveform.

Operation of the circuit is explained with reference to FIGURE 6. Starting at the instant when the deflecting coils 75-76 have zero excitation, the total current flows from source 105 to (assumed for purposes of explanation) anode 95 through transformer primary half 100. When this current is established there will be no flux change in transformer core 102. The excitation from local alternating current generator 63 in increasing in deflecting coils 75 and 76 in a direction to shift the gaseous discharge to anode 93. As this occurs, the current to anode 95 and in transformer half 101-99 is caused to decrease and the current to anode 93 and in half 101-97 is increasing, thus causing a net change in the flux in core 102 and generating a voltage in secondary 109. The build up of the deflecting field due to the energization of the deflecting coils 75-76 causes the transfer of current from anode 95 to anode 93 to progress with increasing speed and the current from anode 95 through transformer primary 101-99 to decrease at a corresponding rate. The increase of current from anode 93 through transformer primary 101-97 causes a corresponding change in oppositely directed flux from the direction caused by anode 95 with the result that the voltage in secondary 109 likewise correspondingly increases the output voltage. When all the tube current has been transferred to anode 93, there will no longer be a change of flux in core 102 and no increase in voltage in winding 109. It is the purpose of accelerating coils 77 and 78 to cause further voltage increases in the output circuit. At this point, the excitation of the accelerating coil takes place to increase the current flowing to the active anode 93 to maintain a constantly increasing flux in the transformer core until the excitation of the accelerating coil reaches its peak value. The timing of the accelerating coil excitation is accomplished by the threshold device which in this case is a zener diode 87. The threshold conducting voltage of the zener diode depends on a number of circuit and load variables, but in general a threshold voltage of approximately 70% of peak voltage is satisfactory to obtain an output closely approximating sine wave shape. As soon as the local oscillator applied voltage in transformer 67 secondary 71-81 decreases from peak value, rectifier 85 open-circuits the excitation to accelerating coil 77. The cycle continues with the current decreasing to anode 93 and the deflecting current decreasing in preparation for the build up after zero voltage value is reached to deflect the plasma to the other side of the tube to re-establish conduction between the cathode and anode 95. The influence on current flow in this part of the circuit due to accelerating coil 78, rectifier 89 and zener diode 91 is identical with that of its counterparts explained supra. In both cases, coils 77 and 78 are oriented so that on the partial cycle of excitation the North pole is directed toward the anode in order to increase the current in the load circuit for the appropriate duration.

Thyratrons could be used in place of the zener diode rectifier combinations to provide the threshold gating control.

The crystal controlled local timing wave generator may be rather more refined than is necessary in many cases and in such cases any well known timing wave generator, such as a cross coupled transistor flip-flop may be used.

While we have described certain specific apparatus for carrying out our invention, it is desired that it be understood that we do not consider our invention to be limited thereto. Various modifications will suggest themselves and may be made without departing from the spirit of this invention. For example, the principles may be extended to the production of polyphase electrical power or to simply supply an intelligence transmitting modulation superimposed on direct current transmission. Accordingly, the invention is to be considered limited only by the appended claims when read in the light of the prior art.

What is claimed is:

1. A device for converting direct current to alternating current comprising a gaseous discharge tube having an envelope, a cathode and two anodes, a pair of deflecting coils supported in collinear relationship with each other with the axial line thereof lying in the plane of the cathode and anodes and transverse to a median line passing from the cathode to a point midway between the anodes, a control coil supported coaxially on the envelope between the cathode and each anode, a timing wave source, means electrically connecting the timing wave source serially with the deflecting coils, means electrically coupling the timing wave source in opposite phase to the two control coils, a source of direct current potential, a power transformer having a mid-tapped primary winding and an output secondary winding, means electrically connecting one each of the end terminals of the primary winding to one each of said anodes, means electrically connecting the mid-tap of the primary winding to the cathode through said source of direct current potential.

2. The device of claim 1 in which said timing wave source is a crystal controlled generator, a control transformer having a primary winding and a secondary winding having at least two end terminals and a center tap terminal, one each of said end terminals being connected to one terminal of a control coil, and the second terminal of each of the control coils being electrically connected together and to the center tap terminal of said control transformer secondary winding.

3. The device of claim 2 in which the connections to the control coils are polarized so that the magnetic fields are oriented with the North pole adjacent the respective anode.

4. The device of claim 3 in which said control transformer secondary winding is provided with a terminal intermediate each of the end terminals and the center terminal, one each of the intermediate terminals being connected to a respective end of the serially connected deflecting coils, whereby the sweep excitation on the sweep coils is of selected amplitude and in synchronization with the control coils excitation.

5. The device of claim 4 in which a rectifier and a threshold gating device are serially connected between the control coils and the respective connection to the control transformer secondary end terminals, the polarity of the rectifier being selected so that the magnetic polarity of the field adjacent the corresponding anode is the North magnetic pole.

6. The device of claim 5 in which the threshold gating device is a zener diode having a threshold conductivity voltage of approximately 70% of the timing wave peak potential whereby the waveform of the generated alternating power current is reinforced proximate the peak value thereof to improve the sine wave similarity thereof.

References Cited by the Examiner
UNITED STATES PATENTS

| | | | |
|---|---|---|---|
| 1,114,697 | 10/1914 | Hull | 321—35 X |
| 2,096,406 | 10/1937 | Llewellyn | 315—21 X |
| 2,326,677 | 8/1943 | Perelmann | 321—35 |
| 2,748,331 | 5/1956 | Krisch | 321—35 X |

JOHN F. COUCH, *Primary Examiner.*

G. GOLDBERG, *Assistant Examiner.*